(12) United States Patent
Lundback et al.

(10) Patent No.: US 7,717,574 B1
(45) Date of Patent: May 18, 2010

(54) METHOD FOR SIMPLIFYING THE IMAGING OF OBJECTS WITH NON-LAMBERTIAN SURFACES

(75) Inventors: Niklas Lundback, San Francisco, CA (US); Travis Threlkel, San Francisco, CA (US); William C. Thibault, San Mateo, CA (US)

(73) Assignee: Obscura Digital, Inc., San Francisco, CA (US)

( * ) Notice: Subject to any disclaimer, the term of this patent is extended or adjusted under 35 U.S.C. 154(b) by 787 days.

(21) Appl. No.: 11/540,033

(22) Filed: Sep. 28, 2006

Related U.S. Application Data

(60) Provisional application No. 60/722,911, filed on Sep. 30, 2005.

(51) Int. Cl.
*G03B 21/00* (2006.01)
(52) U.S. Cl. .............. 353/121; 353/30; 353/31; 353/69; 353/79; 353/122; 356/601; 356/602; 356/603; 356/606; 356/611; 382/118; 382/154; 382/217
(58) Field of Classification Search ........... 353/121, 353/122, 30, 31, 69, 79, 94; 348/745, 746, 348/747; 356/601, 602, 603, 604, 606, 610, 356/611, 612, 613, 388, 389, 390, 391, 392, 356/393, 394; 382/118, 154, 217
See application file for complete search history.

(56) References Cited

U.S. PATENT DOCUMENTS

| | | | |
|---|---|---|---|
| 5,151,845 A * | 9/1992 | Watanabe et al. | 361/234 |
| 5,986,668 A | 11/1999 | Szeliski et al. | 345/433 |
| 6,222,593 B1 | 4/2001 | Higurashi et al. | 348/745 |
| 6,456,339 B1 | 9/2002 | Surati et al. | 348/745 |
| 6,695,451 B1 | 2/2004 | Yamasaki et al. | 353/30 |
| 6,810,279 B2 * | 10/2004 | Mansfield et al. | 600/407 |
| 6,864,921 B2 | 3/2005 | Kaneda et al. | 348/383 |
| 7,002,589 B2 * | 2/2006 | Deering | 345/581 |
| 7,237,911 B2 | 7/2007 | Yamada | 353/121 |
| 2002/0015052 A1 | 2/2002 | Deering | 345/647 |

(Continued)

OTHER PUBLICATIONS

J.Battle, E. Mouddib and J. Salvi "Recent Progress in Coded Structured Light as a Technique to Solve the Correspondence Problem." Pattern Recognition vol. 31, No. 7 (1998), 963-982.

(Continued)

*Primary Examiner*—Georgia Y Epps
*Assistant Examiner*—Sultan Chowdhury
(74) *Attorney, Agent, or Firm*—Haverstock & Owens, LLP

(57) ABSTRACT

For objects with non-Lambertian surfaces, an object surface is mapped by effectively modifying the reflective properties of the object surface being sensed. By effectively making the surface Lambertian with high albedo, a calibration imaging task is achieved using a typical camera from a single or small number of camera positions. The calibration method temporarily modifies the surface properties of the imaged object by applying a thin and opaque layer, such as a coating, covering, or veneer, to the object for the duration of the calibration imaging task. The surface of this layer is a Lambertian reflector, with medium to high albedo. The layer is snugly applied, so a shape of the layer is as close as possible to that of the surface. Once the layer is applied, imaging of the layer surface essentially yields the same shape as the underlying object.

25 Claims, 5 Drawing Sheets

U.S. PATENT DOCUMENTS

2002/0070944 A1    6/2002    Deering ...................... 345/581
2002/0180727 A1   12/2002    Guckenberger et al. ..... 345/418
2004/0207618 A1   10/2004    Williams et al. ............ 345/212

OTHER PUBLICATIONS

P.E. Debevec and J. Malik "Recovering High Dynamic Range Radiance Maps from Photographs".
M.Goesele, Hendrik P.A. Lensch, J. Lang, C. Fuchs, H. Siedel, "Disco Acquisition of Translucent Objects", pp. 1-10.
T. Hawkins, J. Cohen, and P. Debevec, "A Photometric Approach to Digitizing Cultural Artifacts".
H.W. Jensen, S.R. Marschner, M. Levoy, and P. Hanrahan "A Practical Model for Subsurface Light Transport", pp. 1-8.
H. Jin, S. Soatto and A.J. Yezzi. "Multi-View Stereo Beyond Lambert.".
V. Kolmogorov and R. Zabih "Multi-Camera Scene Reconstrruction Via Graph Cuts".
A. Laurentini "The Visual Hull Concept for Silhouette-Based Image Understanding". IEEE Transactions on Pattern Analysis and Machine Intelligence, vol. 16, No. 2, Feb. 1994, pp. 150-162.
M.Levoy, M. Rusinkeiwicz, S. Ginzton, M. Ginsberg, J. Pulli, K. Koller, D. Anderson, S. Shade, J. Curless, B. Periera, L. Davis and D. Fulk, "The Digital Michaelangelo Project: 3D Scanning of Large Statues", pp. 1-14.
A. Wenger,, A. Gardner, C. Tchou, J. Unger, T. Hawkins and P. Debevec, "Performance Relighting and Reflectance Transformation with Time-Mutiplexed Illumination".
T.Yu, N. Xu, N. Ajhua, "Recovering Shape and Reflectance Model of Non-Lambertian Objects From Multiple Views". In IEEE Computer Society Conf. On Computer Vision and Pattern Recognition (2004).
R. Zhang, P., Tsai, J. Cryer, and M. Shah, "Shape from Shading: A Survey." IEEE Trans. On Pattern Analysis and Machine Intelligence vol. 21, No. 8, Aug. 1999, pp. 690-706.
Ramesh Rasker et al., "Quadric Transfer for Immersive Curved Display", Eurographics, vol. 23, No. 3, 2004, and pp. 1-10.
Ramesh Raskar et al., "Seamless Projection Overlaps using Image Warping and Intensity Blending", Fourth International Conference on Virtual Systems and Multimedia, Nov. 1998, and pp. 1-5.
Benjamin Schaeffer et al., "Syzygy: Native PC Cluster VR", IEEE VR, 2003, and 8 pages.
Amnon Shashua et al., "The Quadric Reference Surface: Theory and Applications", Jun. 1994, and pp. 1-13.
Heung-Yeung Shum et al., "Panoramic Image Mosaics", Micorsoft Research, 1997, and pp. 1-50.
R. Matt Steele et al., "Monitoring and Correction of Geometric Distortion in Projected Displays", Department of Computer Science, and 8 pages.
Rajeev j. Surati, "Scalable Self-Calibrating Display Technology for Seamless Large-Scale Displays", Massachusetts Institute of Technology, Jan. 1999, and pp. 1-67.
Jean-Philippe Tardif et al., "Multi-Projectors for Arbitrary Surfaces without Explicit Calibration nor Reconstruction", and 8 pages.
Yalin Xiong et al., "Creating Image-Based VR Using a Self-Calibrating Fisheye Lens", Conference on Computer Vision and Pattern Recognition (CVPR '97); 1997, and pp. 237-243.
Ruigang Yang et al., "Automatic And Continuous Projector Display Surface Calibration Using Every-Day Imagery", Department of Computer Science, and 8 pages.
Mark Ashdown et al., "A Flexible Projector-Camera System for Multi-Planner Displays", IEEE Computer Society, 2004, and 8 pages.
Mark Ashdown et al., "Robust Calibration of Camera-Projector System for Multi-Planar Displays", HP Laboratories Cambridge, Jan. 30, 2004, and 8 pages.
Hynek Bakstein et al., "Panaoramic Mosaicing with a 180° Field of View Lens", IEEE Computer Society, Jun. 2002, and pp. 60-68.
Georffrey Cross et al., "Quadric Reconstruction from Dual-Space Geometry", Sixth International Conference on Computer Vision, 2003, and pp. 25-31.
Carolina Cruz-Neira et al., "Surround-Screen Projection-Based Virtual Reality: The Design and Implementation of the Cave", Annual Conference Series, 1993, and pp. 135-142.
Ned Greene, "Environment Mapping and other Applications of World Projections", Nov. 1986, and pp. 21-29.
Christopher Jaynes et al., "Camera-Based Detection and Removal of Shadows from Interactive Multiprojector Displays", IEEE Transactions on Visualization and Computer Graphics, vol. 10, No. 3, May/Jun. 2004, and pp. 290-301.
Shree K. Nayar, "Catadioptric Omnidirectional Camera", 1997 Conference on Computer Vision and Pattern Recognition (CVPR '97), and pp. 482-488.
Andrew Raij et al. "Auto-Calibration of Multi-Projector Display Walls", IEEE Computer Science, $17^{th}$ International Conference on Pattern Recognition (ICPR '04), and 4 pages.
Ramesh Raskar, "Immersive Planar Display using Roughly Aligned Projectors", IEEE VR2000, Mar. 18-22, 2000, and 7 pages.
L. Battle, E. Mouddib and J. Salvi "Recent Progress in Coded Structured Light as a Technique to Solve the Correspondence Problem." Pattern Recognition vol. 31, No. 7 (1998), 963-982.
A. Laurentini " The Visual Hull Concept for Silhouette-Based Image Understanding". IEEE Transactions on Pattern Analysis and Machine Intelligence, vol. 16, No. 2, Feb. 1994, pp. 150-162.
T. Yu., N. Xu, N. Ajhua, " Recovering Shape and Reflectance Model of Non-Lambertian Objects From Multiple Views". In IEEE Computer Society Conf. On Computer Vision and Pattern Recognition (2004).
R. Zhang, P., Tsai, J. Cryer, and M. Shah, " Shape from Shading: A Survey." IEEE Trans. On Pattern Analysis and Machine Intelligence vol. 21, No. 8, Aug. 1999, pp. 690-706.
Mark Ashdown et al., "A Flexible Projector-Camera System for Multi-Planner Displays", IEEE Computer Society, 2004, and 8 pages.
Mark Ashdown et al., "Robust Calibration of Camera-Projector System for Multi-Planar Displays", HP Laboratories Cambridge, Jan. 30, 2004, and 8 pages.
Hynek Bakstein et al., "Panaoramic Mosaicing with a 180° Field of View Lens", IEEE Computer Society, Jun. 2002, and pp. 60-68.
Michael S. Brown et al., "Low-Cost and Easily Constructed Large Format display System HKUST TR-CS-01-02", Jan. 2001, and 10 pages.
Nelson L. Chang, "Efficient Dense Correspondences using Temporally Encoded Light Patterns", Hewlett-Packard Laboratories, Oct. 12, 2003, and 8 pages.
Han Chen et al., "Scalable Alignment of Large-Format Multi-Projector Displays Using Camera Homography Trees", Oct. 27, 2002, and 8 pages.
Yuqun Chen et al., "Automatic Alignment of High-Resolution Multi-Projector Displays Using an Un-Calibrated Camera", Department of Computer Science, Jan. 2000, and 6 pages.
Georffrey Cross et al., "Quadric Reconstruction from Dual-Space Geometry", Sixth International Conference on Computer Vision, 2003, and pp. 25-31.
Carolina Cruz-Neira et al., "Surround-Screen Projection-Based Virtual Reality: The Design and Implementation of the Cave", Annual Conference Series, 1993, and pp. 135-142.
Jonathan Foote et al., "FlyCam: Practical Panoramic Video and Automatic Camera Control", Jul. 30, 2000, and 4 pages.
David Gotz et al., "The Design and Implementation of PixelFlex: A Reconfigurable Multi-Projector Display System", Department of Computer Science, Jan. 2001, and 8 pages.
Ned Greene, " Environment Mapping and other Applications of World Projections", Nov. 1986, and pp. 21-29.
Markus Gross et al., "blue-c: A Spatially Immersive Display and 3D Video Portal for Telepresence", Jan. 2003, and 9 pages.
Mark Hereld, "Local Methods for Measuring Tiled Display Alignment", Aug. 2003, and 6 pages.
Mark Hereld et al., "DottyToto: A measurement engine for aligning multi-projector display systems", May 29, 2002, and 14 pages.
Greg Humphreys et al., "Chromium: A Stream-Processing Framework for Interactive Rendering on Clusters", Jul. 21, 2002, and 10 pages.

Christopher Jaynes et al., "Camera-Based Detection and Removal of Shadows from Interactive Multiprojector Displays", IEEE Transactions on Visualization and Computer Graphics, vol. 10, No. 3, May/Jun. 2004, and pp. 290-301.

Juho Kannala et al., "A Generic Camera Calibration Method for Fish-Eye Lenses", Aug. 23, 2004, and 4 pages.

Shree K. Nayar, "Catadioptric Omnidirectional Camera", 1997 Conference on Computer Vision and Pattern Recognition (CVPR '97), and pp. 482-488.

Andrew Raij et al., "PixelFlex2: A Comprehensive, Automatic, Casually-Aligned Multi-Projector Display", Department of Computer Science, Jan. 2003, and pp. 1-8.

Andrew Raij et al., "Auto-Calibration of Multi-Projector Display Walls", IEEE Computer Science, 17$^{th}$ International Conference on Pattern Recognition (ICPR '04), and 4 pages.

Ramesh Raskar, "Immersive Planar Display using Roughly Aligned Projectors", IEEE VR 2000, Mar. 18-22 2000, and 7 pages.

Ramesh Raskar, "Multi-Projector Displays Using Camera-Based Registration", Department of Computer Science, Jan. 1999, and 8 pages.

Ramesh Raskar et al., "Blending Multiple View", Jan. 2002, and 9 pages.

* cited by examiner

METHOD FOR SIMPLIFYING THE IMAGING OF OBJECTS WITH NON-LAMBERTIAN SURFACES

RELATED APPLICATIONS

This application claims priority of U.S. provisional application Ser. No. 60/722,911, filed Sep. 30, 2005, and entitled "Method for Simplifying the Imaging of Objects with Non-Lambertian Surfaces", by the same inventors. This application incorporates U.S. provisional application Ser. No. 60/722,911 in its entirety by reference.

FIELD OF THE INVENTION

The invention relates to a method of projector displays. More particularly, the invention relates to calibrating a projector for imaging of objects with non-Lambertian surfaces.

BACKGROUND OF THE INVENTION

Using images of objects to derive information such as the object's shape has many uses. Examples include surveillance, geographic information systems, and machine inspection of manufactured goods. Other examples include single projector or multiple projector display systems designed to display images on many different types of surfaces, including two-dimensional projection screens and three-dimensional objects.

Many techniques are used for mapping a surface shape of an object. Most techniques utilize one or more projectors to project display images onto the object. A camera is used to capture images of the object as the display images are projected onto the object's surface. The images taken by the camera are used to register each of the projectors. These display systems compute transformations which are applied to each image to be projected. The observed position of projected features observed in the camera image are used to create an explicit list of correspondences between the image to be projected and the actual display surface positions. These correspondences are interpolated to create a mapping between each projector pixel and the display surface.

A so-called "shape-from-shading" technique makes assumptions about the illumination and light reflecting properties of the surface in question, and uses image intensities to estimate a surface normal at each point on the surface. Stereo and multi-view imaging techniques use two or more images of the same object in order to determine the surface shape. Structured-light techniques (also called active sensing) use a projected light pattern of known shape, together with a camera, in order to capture information about the surface shape. The use of a known projected light pattern simplifies the generation of correspondences between locations in the projected pattern and locations in the camera image. Other techniques calibrate display systems by using a camera to capture images of the display surface illuminated with projections of a sequence of patterns (also called coded structured light).

For all such display systems, non-Lambertian (e.g., shiny, transparent, translucent) surfaces are problematic. A Lambertian surface reflects the light equally in all directions. If a surface is a Lambertian surface, the appearance of the surface doesn't vary with viewpoint. An enlarged, cross section of a Lambertian surfaces indicates a rough or jagged surface. So, there are no preferred angles of reflection. Lambertian surfaces are also called diffuse surfaces. FIG. 1 illustrates a 100% specular surface, which is non-Lambertian. An impinging light 14 impinges a surface 12 of an object 10. The surface 12 is 100% specular. As such, the impinging light 14 is reflected such that an intensity of the reflected light 16 is equal to an intensity of the of the impinging light 14. Also, as there is no scattering of the impinging light 14 on a 100% specular surface, the reflected light 16 is reflected at the mirror angle. In other words, the angle of the impinging light 14, angle $\theta_I$, measured from the surface normal is equal to the angle of the reflected light 16, angle $\theta_R$, measured from the surface normal. FIG. 2 illustrates a 100% diffuse surface, which is Lambertian. The impinging light 14 impinges a surface 22 of an object 20. The surface 22 is 100% diffuse. As such, the impinging light 14 is reflected such that an intensity of the reflected light 26 is equally distributed in all directions. The sum of the intensities of all reflected light 26 is equal to the intensity of the impinging light 14.

When all or a portion of the display surface is not a diffuse reflector (e.g., the surface is non-Lambertian), certain portions of the projected pattern can appear too bright or too dark in the captured image, resulting in failures to identify the projected pattern. For example, a "hotspot" or highlight, can over-saturate the camera sensor in a region that is highly specular (that is, "shiny" in the sense of a mirror or highly polished surface) where the camera and projector lie along the "mirror angle", such as illustrated in FIG. 3. In the exemplary configuration of FIG. 3, a surface 32 of an object 30 is highly specular. A camera 60 is positioned at the mirror angle relative to a projector 50. In such a configuration, the intensity of the reflected light 36 captured by the camera 60 can over-saturate the camera sensor. It can also happen that a specular surface reflects too little light to be detected, such as when the camera is placed too far off from the "mirror angle", such as illustrated in FIG. 4. For a highly specular surface, such as the surface 32, the further the camera 60 is from the mirror angle, the lower the intensity of the reflected light 46. Low intensity reflections can also occur when a display surface with a low albedo is used (e.g., one painted a dark color).

For translucent surfaces, projected light can penetrate the surface, be scattered by the material below the surface, and then leave the object at a different point on the surface. This phenomenon is called subsurface scattering. FIG. 5 illustrates an example of subsurface scattering. The projected light 14 impinges a surface 52 of a translucent material 50. The projected light 14 scatters within the material 50 as refracted and scattered light 54. Some of the refracted and scattered light 54 can exit the surface 52 as reflected light 56. The reflected light 56 can be reflected in many different directions, typically at low intensities.

Translucent and transparent surfaces can transmit impinging light and can also reflect the same impinging light, whether the impinging light encounters the surfaces internally or externally to the object. FIG. 6 illustrates an example of light impinging a transparent material. The impinging light 14 impinges a surface 62 of a transparent material 60. A portion of the impinging light 14 is reflected as reflected light 63 and another portion of the impinging light 14 is transmitted as refracted light 62 through the transparent material 60. When the refracted light 62 impinges a second surface 61 of the transparent material 60, a portion of the refracted light 62 is reflected off the second surface as reflected light 64 and another portion of the refracted light 62 passes through the second surface, thereby exiting the transparent material 60, as refracted light 66. The reflected light 64 is transmitted through the transparent material 60. When the reflected light 64 impinges the first surface 62, a portion of the reflected light 64 is reflected back into the transparent material 60 as reflected light 67, and another portion of the reflected light 64 passes through the first surface 62, as refracted light 65, and so on. In this case, the impinging light 14 can leave the object at a different point than at which it first encounters the surface, such as refracted light 65 and refracted light 66. These phenomena can result in incorrect position data.

Many conventional cameras use CMOS or CCD image sensors to capture images. However, CMOS and CCD image sensors have a limited dynamic range. The effective dynamic range is bounded by a minimum threshold and a maximum threshold. The minimum threshold defines a minimum number of photons that the image sensor must capture to detect an image, and to avoid under-exposure. The maximum threshold defines a maximum number of photons that the image sensor can capture before the image becomes over-exposed. After a certain number of photons have charged an individual collection site (pixel), the site becomes saturated, and cannot record any additional photons. The minimum number of photons that can be measured is also limited, due to the effects of heat in the sensor site itself, which makes it difficult, if not impossible, to get a true "zero" reading from the sensor. For example, digital images under low-light conditions look "noisy" or "grainy." The rate at which photons are admitted to the sensor can be controlled by changing either (or both) of the aperture (size of the lens opening) or the "exposure time." The exposure time is the amount of time the sensor is allowed to collect photons.

The exposure time can be controlled with a physical shutter or an electronic shutter. The physical shutter opens and closes to briefly allow light through the lens. The electronic shutter works by discharging the sensor site (pixel) and then allowing the sensor site to collect photons for some period of time. Subsequently, this charge is electronically transferred to a storage site, where it is later read, as in global shuttering. Alternatively, the value of the charge is simply read at some later point in time, as in rolling shutter. The resulting charge is then measured and converted to a discrete digital value. Typically, the values are roughly linearly spaced, and can be further modified by a digitally-implemented transfer function. The resulting value for the pixel irradiance is typically stored as an 8-bit, unsigned integer. In the case of color cameras, three such values are stored, one per primary color, where a separate sensor, covered with an appropriately-colored filter, captures the intensity of each primary color. As a final step, the image is typically stored in a compressed image format, such as JPEG, to the camera's storage medium.

The effective dynamic range of a CMOS or CCD camera can be, in effect, extended using "high dynamic range" (HDR) imaging techniques. In HDR imaging, multiple images, taken with different exposure times, are made while keeping the position of the camera, the position of the object, and the position(s) of any light source(s) fixed. HDR imaging provides a larger dynamic range of brightness, which is then combined and compressed. However, cameras that provide HDR imaging are very expensive. Techniques for capturing HDR imagery with available cameras exist, but require multiple images to be captured, on the order of 16 exposures per single frame. The subsequent time to process these additional images is prohibitive in most applications.

For a specific imaging task, capturing many images of the object may be required. For example, in a coded structured light task, several images may be required, each capturing the object illuminated by a different light pattern. Multiview techniques may require multiple images from different camera positions. The total number of images required to complete the specific image capture task may then exceed the storage capacity of the camera. Also, the total number of images required to be captured may require more time than is available for the task. For example, each individual image may require several seconds to capture, depending on the camera used. Increasing this capture time can be impractical.

The collection of multiple exposures making up the HDR image must be further manipulated by post-processing operations to be useful. The results of the post-processing are then stored in non-traditional image formats, for example, storing pixel values as 24 or 32-bit floating point values. These non-traditional image formats are not supported by typical software tools. There is no universally accepted standard format, as there is for traditional 8-bit-per-pixel images, such as JPEG. If, instead of this post-process, the entire collection of separate images are used, then 16 times the storage space, transfer time, and memory space are required to process the images. These issues relating to HDR imaging result in an orders-of-magnitude increase in the storage cost and processing time for an imaging task, as compared to the storage and processing of single-exposure, 8-bit or 10-bit images in traditional formats.

Despite the increased dynamic range afforded by HDR techniques, and hence their ability to handle very bright or dim reflections, as in FIGS. 3 and 4, these techniques do not overcome the problems with translucent and transparent materials, as in FIGS. 5 and 6. Further, there are other fundamental limitations in camera sensors that HDR techniques cannot overcome. In cases where the illumination exceeds the minimum or maximum limits of the irradiance range of the camera, the desired information is not present in any image, at any exposure. In these situations, the information (e.g., the capture image of the object as illuminated with the structured light pattern) is simply not captured and cannot be recovered. The resulting inability to complete the structured-light imaging task results in the failure of the application.

An alternative to HDR imaging for capturing non-Lambertian surface properties is to image the object from a multitude of illumination and/or sensor angles. Techniques using this approach are referred to as "multi-view techniques." With enough captured images, some images may not have the sort of problems indicated in FIGS. 3 and 4, for highly specular surfaces. In many multi-view techniques, multitudes of images are captured from a large number of vantage points to enable capture of object geometry. Other multi-view techniques use a multitude of illumination angles. Such techniques either require the object to be mounted on a turntable, or a large number of images from different vantage points to be taken by mounting an array of cameras/lights, which is expensive, and/or repositioning the camera/lights and taking multiple images, which is time consuming. However, it is often impossible, in real-world situations, to obtain images from these multiple viewpoints, or multiple illumination angles.

Recent approaches for capturing both shape and surface properties of non-Lambertian materials have several drawbacks, including but not limited to, requiring careful initialization, assuming the surface has uniform reflectance properties, and limitations to specifically shaped objects. Many such approaches result in low-fidelity estimates of surface geometry.

Approaches that attempt to deal with phenomena such as subsurface scattering combine multi-view and HDR techniques, thereby acquiring the drawbacks of both approaches. Both HDR techniques and multi-view techniques for imaging of non-Lambertian surfaces are cumbersome, slow, require large amounts of storage and processing, are often impractical, and can fail completely in some circumstances.

SUMMARY OF THE INVENTION

For objects with non-Lambertian surfaces, an object surface is mapped by effectively modifying the reflective properties of the object surface being sensed. By effectively making the surface Lambertian with high albedo, a calibration imaging task is achieved using a typical camera from a single or small number of camera positions. The calibration method temporarily modifies the surface properties of the imaged object by temporarily applying a thin and opaque layer, such as a coating, covering, or veneer, to the object for the duration of the calibration imaging task. The surface of this layer is a Lambertian reflector, with medium to high albedo. The layer is snugly applied, so a shape of the layer is as close as possible to that of the surface. Once the layer is applied, imaging of the layer surface essentially yields the same shape as the underlying object. After the projector calibration process is completed, the applied layer is removed from the object surface.

In one aspect, a method of calibrating one or more projectors within a display system is disclosed. The method includes positioning the one or more projectors, a camera, and an object, wherein the display system is configured such that the one or more projectors project display images onto an object surface of the object, applying a top layer to the object surface, wherein the top layer is a substantially diffuse layer, performing a projector calibration process for each of the one or more projectors, thereby generating a mapping function between the one or more projectors and the object surface according to reflective characteristics of the top layer, removing the top layer from the object surface, and projecting display images onto the object surface according to the mapping function. The top layer substantially conforms to a contour of the object surface. One or more portions of the object surface comprise a non-Lambertian surface. The top layer can be applied to a portion of the object surface.

In another aspect, another method of calibrating one or more projectors within a display system is disclosed. The method includes positioning the one or more projectors, a camera, and an object, wherein the display system is configured such that the one or more projectors project display images onto an object surface of the object, applying a substantially diffuse layer to the object surface, thereby temporarily modifying surface properties of the object, performing a projector calibration process for each of the one or more projectors, thereby generating a mapping function between the one or more projectors and the object surface, removing the substantially diffuse layer from the object surface, and projecting display images onto the object surface according to the mapping function. Applying the substantially diffuse layer forms a substantially Lambertian surface that approximates a shape of the object.

In yet another aspect, another method of calibrating one or more projectors within a display system is disclosed. The method includes positioning the one or more projectors, a camera, and an object, wherein the display system is configured such that the one or more projectors project display images onto an object surface of the object, applying a removable layer to the object surface, wherein the removable layer is substantially diffuse and is configured to approximate a shape of the object, performing a projector calibration process for each of the one or more projectors, thereby generating a mapping function between the one or more projectors and the removable layer, removing the removable layer from the object surface, and projecting display images onto the object surface according to the mapping function.

In each of the described methods, the top layer can be applied by applying electrostatic force to the top layer to hold the top layer in position relative to the object surface. The top layer can be applied by applying an adhesive to the object surface prior to applying the top layer to the object surface. The top layer can be applied by applying an adhesive to a surface of the top layer prior to applying the top layer to the object surface. The top layer can be applied by applying a vacuum such that the top layer is forced onto the object surface. The top layer can be a cover, a tarp, a sheet of material, an elastic material, or a coat of substantially diffuse particles.

BRIEF DESCRIPTION OF THE DRAWINGS

Embodiments of the calibration methodology are described relative to the several views of the drawings. Where appropriate and only where identical elements are disclosed and shown in more than one drawing, the same reference numeral will be used to represent such identical elements.

DETAILED DESCRIPTION OF THE PRESENT INVENTION

Embodiments of the present invention are directed to a method of and system for calibrating a display system that is to project images onto a non-Lambertian object surface. Those of ordinary skill in the art will realize that the following detailed description of the present invention is illustrative only and is not intended to be in any way limiting. Other embodiments of the present invention will readily suggest themselves to such skilled persons having the benefit of this disclosure.

Reference will now be made in detail to implementations of the present invention as illustrated in the accompanying drawings. The same reference indicators are used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
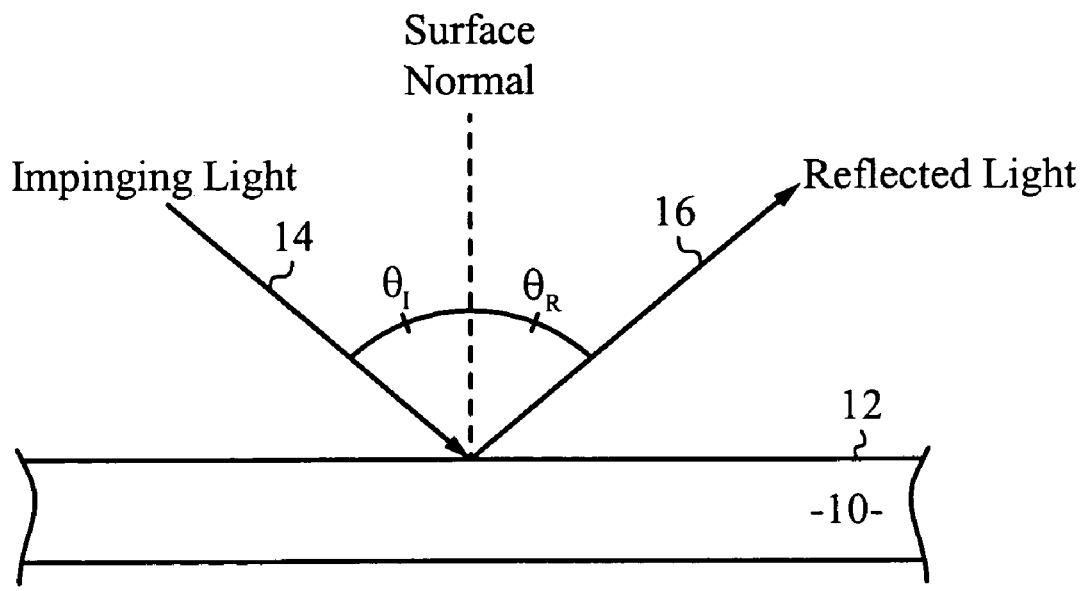
FIG. 1 illustrates a 100% specular surface.
Figure 2:
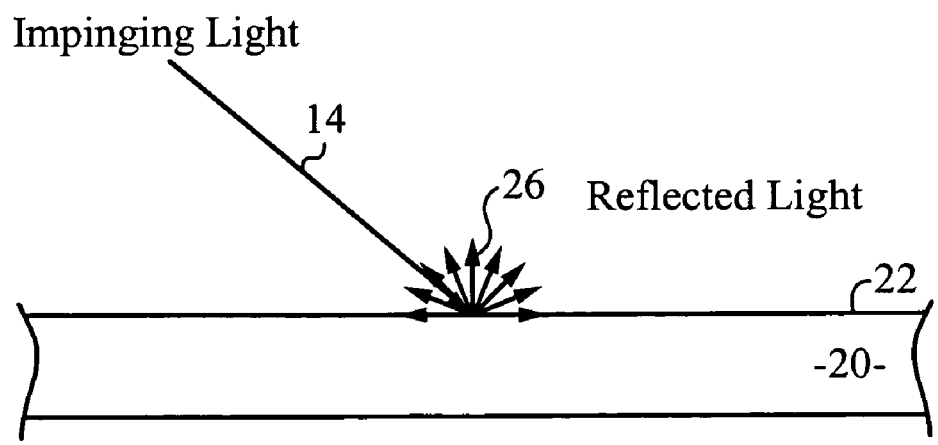
FIG. 2 illustrates a 100% diffuse surface
Figure 3:
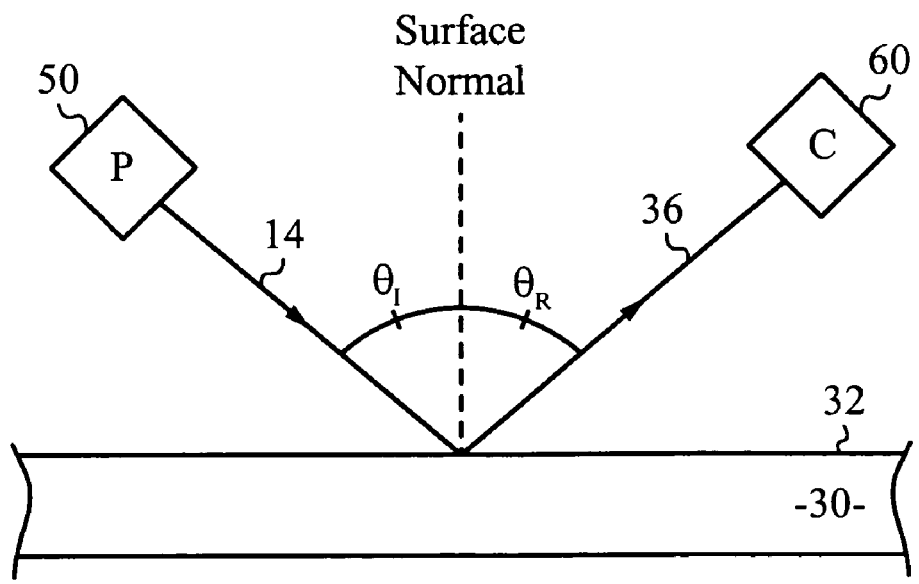
FIG. 3 illustrates an exemplary display system configuration resulting in a "hotspot" that can saturate a camera sensor.
Figure 4:
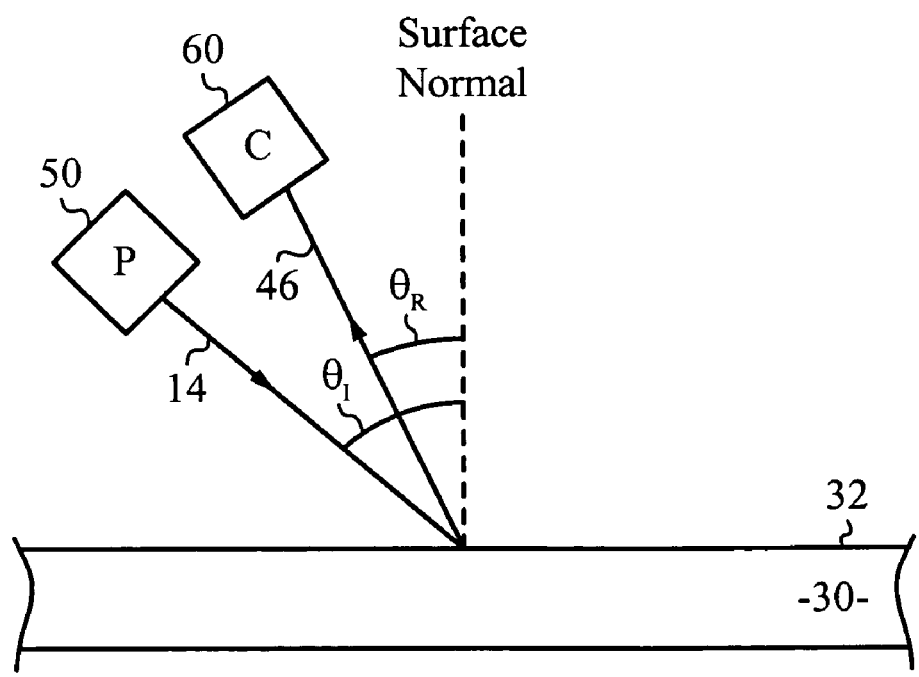
FIG. 4 illustrates an exemplary display system configuration resulting in a low-intensity reflection that the camera sensor may not be able to record.
Figure 5:
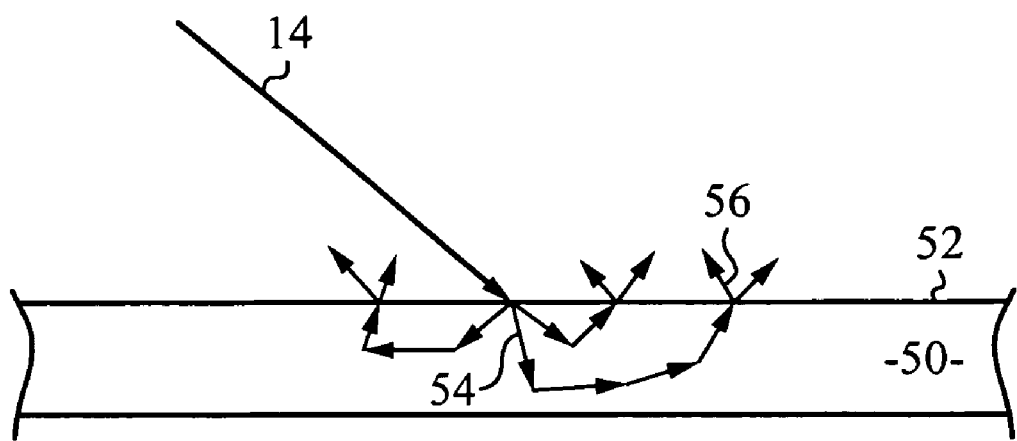
FIG. 5 illustrates an example of subsurface scattering.
Figure 6:
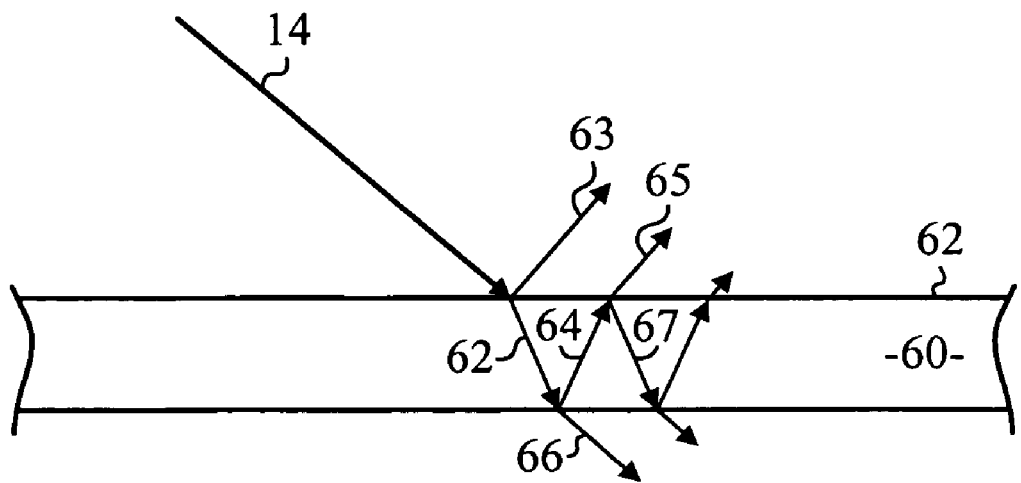
FIG. 6 illustrates an example of light impinging a transparent material.
Figure 7:
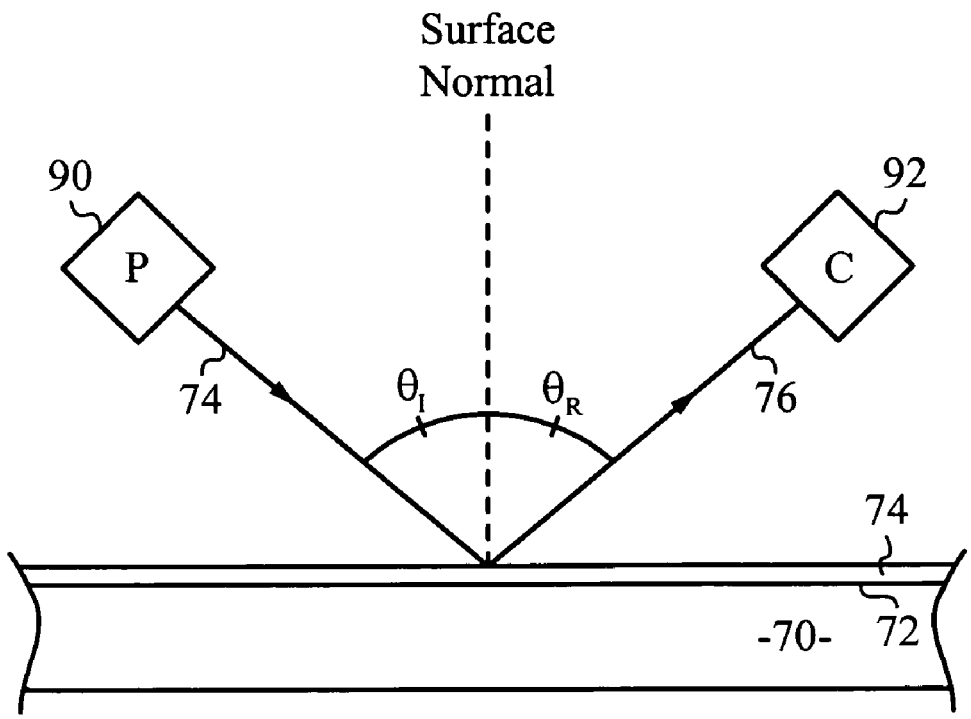
FIG. 7 illustrates an exemplary projector calibration system of the present invention.
Figure 8:
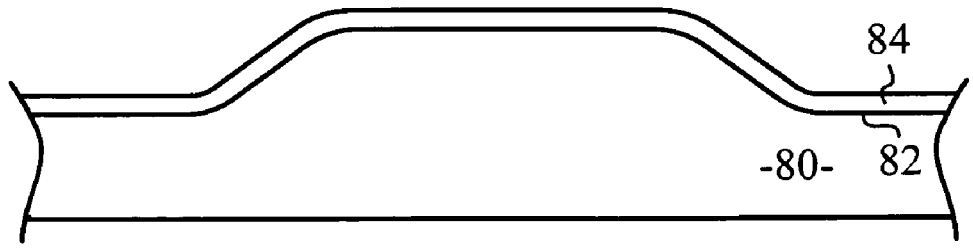
FIG. 8 illustrates an alternatively shaped object including an object surface.

FIG. 7 illustrates an exemplary projector calibration system of the present invention. An object 70 includes a surface 72. The surface 72 shown in FIG. 7 is a two-dimensional planar surface. In general, the calibration method can be used on any shaped object, including a three-dimensional, non-planar object surface. A top layer 74 is applied to the object surface 72. The top layer 74 is a temporary layer that is removable. The top layer 74 is configured to modify the reflectance characteristics of the object surface 72 so as to substantially remove any non-Lambertian characteristics. The top layer 74 is also configured to substantially match the contour of the object surface 72. In effect, the top layer 74 forms a Lambertian surface that substantially matches the contour of the object surface 72. FIG. 8 illustrates an alternatively shaped object 80 including an object surface 82. A top layer 84 is applied to the object surface 82 so that the contour of the top layer 84 substantially matches the contour of the object surface 82.

Images are projected onto the surface 72 as impinging light 74. A projector 90 projects a series of display images toward the surface 72 at an angle of reflection $\theta_I$ measured from the surface normal at the point of impingement. A camera 92 captures the series of display images projected onto the object 70. The camera 92 is aligned to receive a reflected light 76 corresponding to the impinging light 74. The reflected light 76 is reflected at an angle of reflection $\theta_R$ measured from the surface normal. FIG. 7 illustrates the impinging light 74 and the reflected light 76 at a single angle of incidence and a single point of intersection with the object surface. It is understood that this is a simplified rendition of the actual projected light emitted from the projector 90 and the corresponding reflected light captured by the camera 92. For example, the light projected by the projector 90 is divergent light, as in a conical light beam.

In some embodiments, the camera 92 is positioned at a mirror angle relative to the projector 90. In other words, the angle of reflection $\theta_R$ measured from the surface normal is equal to the angle of reflection $\theta_I$. In alternative embodiments, the camera 92 is positioned at an angle different than the mirror angle. The relative positions of the projector 90 and the camera 92, as shown in FIG. 7, are for exemplary purposes only. It is understood that the projector 90 and the camera 92 can be alternatively positioned.

The projector 90 is calibrated using any conventional calibration method. In some embodiments, the projector 90 projects a structured light sequence which is captured by the camera 92. Using the captured images from the camera 92, correspondences are derived between the images to be projected by the projector 90 and the actual image as it is displayed on the object surface. These correspondences are interpolated to create a mapping between each projector pixel and the display surface. On such calibration method is described in the co-pending and co-owned U.S. patent application Ser. No. 11/407,731, filed on Apr. 19, 2006, and entitled "A Method of and Apparatus for Repairing Images Displayed by a Projector," which is hereby incorporated by reference.

In general, one or more cameras are used to capture a display object's shape during a calibration process. The object's shape is determined by observing the surface, possibly illuminated with structured light from a small number of camera positions, in some cases a single camera position. In some embodiments, a typical 8-bit image format is used to simplify processing.

For objects with non-Lambertian surfaces, the object surface is determined by effectively modifying the reflective properties of the object surface being sensed. By effectively making the surface Lambertian with high albedo, for example a matte white surface, the calibration imaging task is achieved using a typical camera from a single or small number of camera positions.

The calibration method temporarily modifies the surface properties of the imaged object by applying a thin and opaque layer, such as a coating, covering, or veneer, to the object for the duration of the calibration imaging task. The surface of this layer is a Lambertian reflector, with medium to high albedo. In some embodiments, a thickness of the layer is small to negligible, compared to the scale of the object. The layer is snugly applied, so a shape of the layer is as close as possible to that of the surface. Once the layer is applied, imaging of the layer surface essentially yields the same shape as the underlying object, and does not exhibit the problems described above in relation to FIGS. 3-6.

The layer need not be applied to the entire object. It suffices to apply the layer only to the object portion involved in the imaging task.

The Lambertian surface, or layer, can comprise many different forms and can be applied to the object of interest using several different methods. The layer can be a tarp, sheet, or other cover material. The layer can be coupled to the object surface using an adhesive, such as rubber cement. The layer can be draped over the object, and gravity holds the layer to the object. The layer can be manufactured in a rigid form, in the shape of the object, and placed on the object and held in place by any means, such as gravity, electrostatic force, or adhesive. The layer can be applied to the object as a coating consisting of small Lambertian particles such as a powder, which is combined with a binding agent or electrical charge to attach the particles to the object. The layer can be composed of a malleable substance, such as clay, that is applied to the object and spread to cover it. The layer can be attached with one-sided or two-sided tape. The layer can be painted on the object, using a brush, aerosol applicator, or immersion bath. The layer can be attached to the object by electrostatic force, which involves giving the object surface and the layer opposite electrical charges. The layer can be an elastic material, such as a latex or rubber sheet, that is stretched when applied to the object, such that the layer is held to the object by elastic forces. The layer can be a flexible, possibly elastic material from which air can be evacuated, forming a vacuum that pulls the layer to the actual surface of the object. Note that the use of a vacuum enables the layer to conform to the true object shape, including configurations where portions of the object's surface is concave. The layer can be comprised of numerous small life forms, such as lichens, barnacles, insects, coral, or bacteria that grow, or otherwise distribute themselves over the object, adjacent to one another, such that after initial application to a small area, and allowing for a period of growth, motion, and/or reproduction, the object is covered. The layer can be comprised of a team of very small autonomous robots that reproduce or reconfigure themselves in such a way as to cover the object. It is understood that other types of layers can be used to produce the Lambertian surface.

Techniques for removal of the layer from the object depend on the method of attachment. Adhesives can be removed with appropriate solvents, or by mechanical means, such as pulling and rubbing the object. Electrostatic charges can be dispersed by use of a grounded spatula or probe. A team of autonomous robots can be configured to remove themselves from the object and return to their container once the imaging task is complete.

Figure 9:
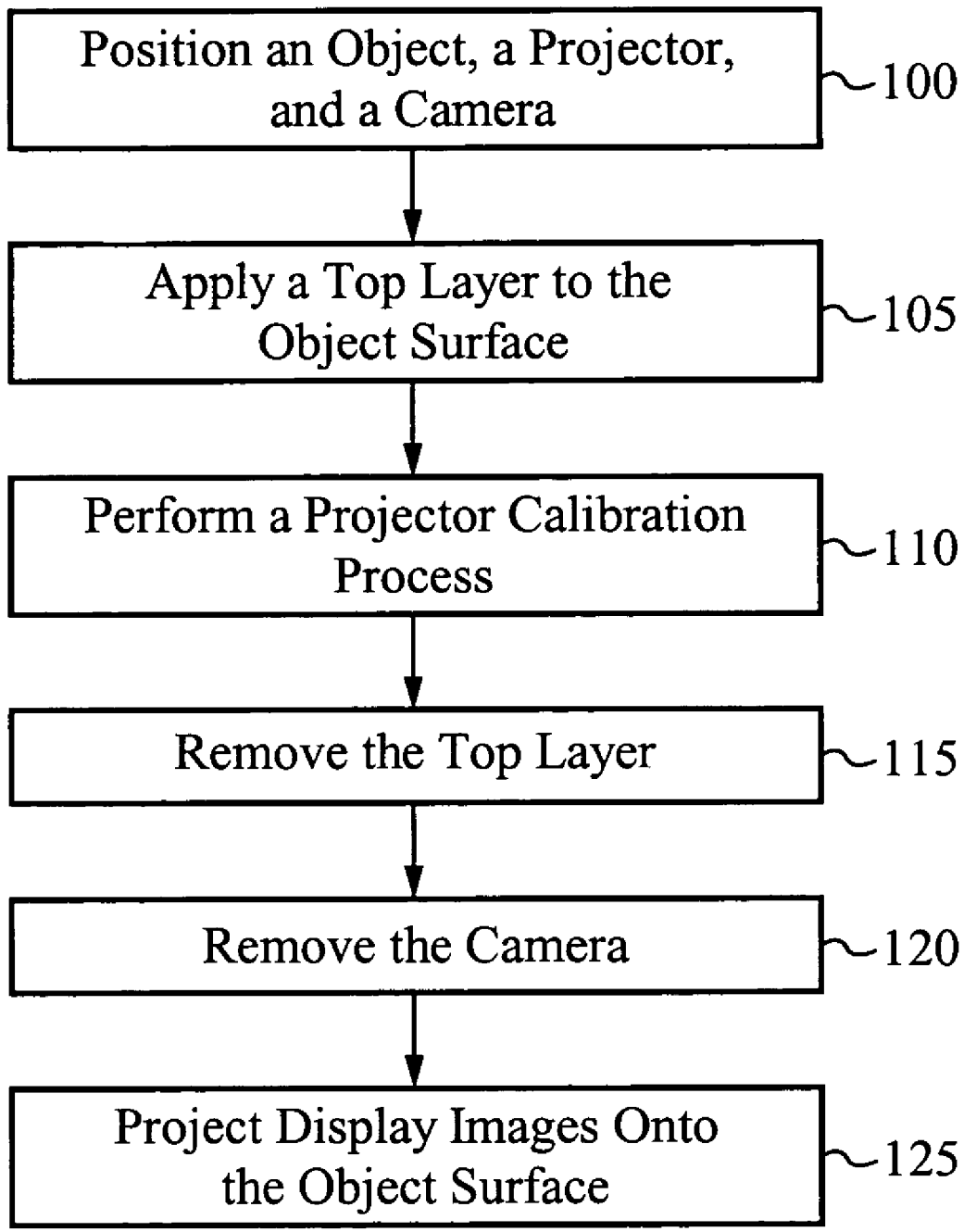
FIG. 9 illustrates an exemplary calibration method of the present invention.

FIG. 9 illustrates an exemplary calibration method of the present invention. At the step 100, a projector, a camera, and an object to be projected onto are positioned within a display system. In some embodiments, a single-projector display system is used. In some embodiments, a multiple-projector display system is used. The projector is positioned to project display images onto the object. The camera is positioned to capture the images projected on the object surface. At the step 105, a top layer is applied to the object surface. The top layer is a diffuse and opaque material that substantially conforms to the shape of the object. The top layer is temporary and removable. At the step 110, a projector calibration process is performed, thereby forming a mapping function between each projector pixel and the object surface onto which the images are projected. After the projector calibration process is performed, the top layer is removed at the step 115. At the step 120, the camera is removed from the display system. At the step 125, the display images are projected onto the object surface according to the mapping function generated in the step 110.

The calibration method can be applied in several practical situations. For example, structured-light techniques are used to geometrically calibrate one or more video projectors, thereby making it possible to create a single projected image. The geometric calibration information is used to pre-warp the projected imagery in such a way as to counteract the effects of off-axis projection, curved or irregular surfaces, etc. Using the calibration method, the result is a projection that, while possibly suffering from non-Lambertian reflectance artifacts such as hotspots, is nonetheless correctly calibrated in the geometric sense (e.g., does not appear distorted). In other words, although the calibration method has calibrated the projector according to the object's geometry, the object surface still exhibits it's original non-Lambertian reflectance. As such, any projected image onto the object will still encounter the non-Lambertian reflectances. The projected image does not appear distorted, because of the calibration performed used the calibration method, but the reflectance phenomenon that originally existed has not been eliminated. For example, a new car is still shiny even though the calibration is performed using the Lambertian layer. Human viewers are able to perceive the intended display, which includes the projected images and the original non-Lambertian reflectance artifacts, and can easily ignore the effects of the non-Lambertian reflection.

Another practical application of the calibration method is when attempting to capture the shape of a non-Lambertian object, such as a cut diamond, or highly polished or translucent jewelry.

Although the system described in relation to FIG. 7, and the associated calibration methods, include a single projector and a single camera, the calibration system and method can be applied to a system including multiple projectors and/or multiple cameras.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A method of calibrating one or more projectors within a display system, the method comprising:

a. positioning the one or more projectors, a camera, and an object, wherein the display system is configured such that the one or more projectors project display images onto an object surface of the object;
   b. applying a top layer to the object surface, wherein the entire top layer is a substantially diffuse layer and substantially conforms to a contour of the object surface;
   c. performing a projector calibration process for each of the one or more projectors, thereby generating a mapping function between the one or more projectors and the object surface according to reflective characteristics of the top layer;
   d. removing the top layer from the object surface; and
   e. projecting display images onto the object surface according to the mapping function.

2. The method of claim 1 wherein the object is three-dimensional and the object surface is non-planar.

3. The method of claim 1 further comprising applying a vacuum to the top layer such that air is evacuated from between the top layer and the object surface, thereby forcing the top layer onto the object surface.

4. The method of claim 1 wherein one or more portions of the object surface comprise a non-Lambertian surface.

5. The method of claim 1 wherein the top layer is applied to a portion of the object surface.

6. The method of claim 1 further comprising applying electrostatic force to the top layer to hold the top layer in position relative to the object surface.

7. The method of claim 1 further comprising applying an adhesive to the object surface prior to applying the top layer to the object surface.

8. The method of claim 1 further comprising applying an adhesive to a surface of the top layer prior to applying the top layer to the object surface.

9. The method of claim 1 wherein the top layer comprises a cover, a tarp, or a sheet of material.

10. The method of claim 1 wherein the top layer comprises an elastic material.

11. The method of claim 1 wherein the top layer comprises a coat of substantially diffuse powder particles.

12. A method of calibrating one or more projectors within a display system, the method comprising:

a. positioning the one or more projectors, a camera, and an object, wherein the display system is configured such that the one or more projectors project display images onto an object surface of the object;
   b. applying a substantially diffuse layer to the object surface that approximates a shape of the object, thereby temporarily modifying surface properties of the object;
   c. performing a projector calibration process for each of the one or more projectors, thereby generating a mapping function between the one or more projectors and the object surface;
   d. removing the substantially diffuse layer from the object surface; and
   e. projecting display images onto the object surface according to the mapping function.

13. The method of claim 12 wherein applying the substantially diffuse layer forms a substantially Lambertian surface.

14. The method of claim 12 further comprising applying an adhesive to the object surface prior to applying the top layer to the object surface.

15. The method of claim 12 further comprising applying an adhesive to a surface of the top layer prior to applying the top layer to the object surface.

16. The method of claim 12 wherein the top layer comprises a cover, a tarp, or a sheet of material.

17. The method of claim 12 wherein the top layer comprises an elastic material.

18. The method of claim 12 wherein the top layer comprises a coat of substantially diffuse particles.

19. A method of calibrating one or more projectors within a display system, the method comprising:
 a. positioning the one or more projectors, a camera, and an object, wherein the display system is configured such that the one or more projectors project display images onto an object surface of the object;
 b. applying a removable layer to the object surface, wherein the entire removable layer is substantially diffuse and is configured to approximate a shape of the object;
 c. performing a projector calibration process for each of the one or more projectors, thereby generating a mapping function between the one or more projectors and the removable layer;
 d. removing the removable layer from the object surface; and
 e. projecting display images onto the object surface according to the mapping function.

20. The method of claim 19 further comprising applying an adhesive to the object surface prior to applying the top layer to the object surface.

21. The method of claim 19 further comprising applying an adhesive to a surface of the top layer prior to applying the top layer to the object surface.

22. The method of claim 19 wherein the top layer comprises a cover, a tarp, or a sheet of material.

23. The method of claim 19 wherein the top layer comprises an elastic material.

24. The method of claim 19 wherein the top layer comprises a coat of substantially diffuse particles.

25. The method of claim 1 wherein the top layer is opaque.

* * * * *

UNITED STATES PATENT AND TRADEMARK OFFICE
CERTIFICATE OF CORRECTION

PATENT NO.         : 7,717,574 B1
APPLICATION NO.    : 11/540033
DATED              : May 18, 2010
INVENTOR(S)        : Niklas Lundback et al.

It is certified that error appears in the above-identified patent and that said Letters Patent is hereby corrected as shown below:

TITLE PAGE ITEM 56 IN THE REFERENCES CITED - OTHER PUBLICATIONS - p. 1

Replace "A. Wenger,, A. Gardner, C. Tchou, J. Unger, T. Hawkins and P. Debevec, 'Performance Relighting and Reflectance Transformation with Time-Multiplexed Illumination'." with "A. Wenger, A. Gardner, C. Tchou, J. Unger, T. Hawkins and P. Debevec, 'Performance Relighting and Reflectance Transformation with Time-Multiplexed Illumination' July 2005, 9 pages."

Signed and Sealed this

Sixth Day of July, 2010

David J. Kappos
*Director of the United States Patent and Trademark Office*